MAGNETIC RECORDING MEDIUM AND METHOD OF MANUFACTURE

Filed June 12, 1963

2 Sheets-Sheet 1

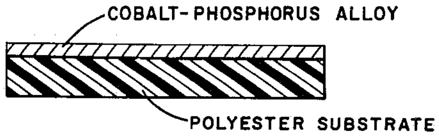

FIG. 1

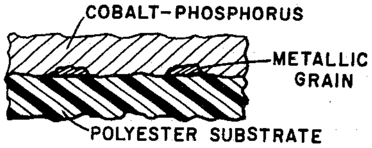

FIG. 2

HYDROLYSIS: IMMERSE MYLAR SUBSTRATE IN SOLUTION:
200 g/l NaOH
150 ml/l propylene glycol
AT 80–85°C FOR 3 MINUTES SENSITIZATION: IMMERSE MYLAR SUBSTRATE IN SOLUTION:
70 g/l $SnCl_2$
50 ml/l HCl
0.5 gm/l Na-lauryl-$SO_4$
AT ROOM TEMPERATURE FOR 2 MINUTES ACTIVATION: IMMERSE MYLAR SUBSTRATE IN SOLUTION:
10 g/ℓ $AgNO_3$ SEEDING: IMMERSE MYLAR SUBSTRATE IN SOLUTION:
0.1 g/l $PdCl_2$
1.0 ml/l HCl
AT ROOM TEMPERATURE FOR 2 MINUTES

PLATING: IMMERSE MYLAR SUBSTRATE IN SOLUTION:

| | |
|---|---|
| $CoSO_4$ $7H_2O$ | 30 g/ℓ |
| NaK-TARTRATE | 50 g/ℓ |
| $NH_4Cl$ | 50 g/ℓ |
| $NaH_2PO_4$ $H_2O$ | 20 g/ℓ |

$NH_4OH$ TO adjust pH
AT 65–70°C AND pH 8–11 FOR 10 TO 15 MINUTES
TO PLATE 20–25 MICRO-INCHES

BONDING:
AGE
OR
HEAT TREAT AT 70°C FOR 1 TO 60 MINUTES

FIG. 3

INVENTORS
BETTY LEE BERDAN
BETTY M. LUCE
MILTON L. SELKER

HYDROLYSIS: IMMERSE MYLAR SUBSTRATE IN SOLUTION:
200g/l NaOH
150ml/l propylene glycol
AT 80–85°C FOR 3 MINUTES

SEEDING: IMMERSE MYLAR SUBSTRATE IN
PALLADIUM SOL FOR
1 TO 2 MINUTES

PLATING: IMMERSE MYLAR SUBSTRATE IN SOLUTION:

| | |
|---|---|
| $CoSO_4$ 7H O | 30 g/ℓ |
| NaK–TARTRATE | 50 g/ℓ |
| $NH_4Cl$ | 50 g/ℓ |
| $NaH_2PO_4$ $H_2O$ | 20 g/ℓ |
| $NH_4OH$ TO adjust pH | |

AT 65–70°C AND pH 8–11 FOR 10 TO 15 MINUTES
TO PLATE 20–25 MICRO-INCHES

BONDING:
AGE
OR
HEAT TREAT AT 70°C FOR 1 TO 60 MINUTES

FIG. 4

*INVENTORS*
BETTY LEE BERDAN
BETTY M. LUCE
MILTON L. SELKER

3,245,826
MAGNETIC RECORDING MEDIUM AND METHOD OF MANUFACTURE

Betty M. Luce and Betty Lee Berdan, Willowick, and Milton L. Selker, Shaker Heights, Ohio, assignors to Clevite Corporation, a corporation of Ohio Filed June 12, 1963, Ser. No. 288,588
17 Claims. (Cl. 117—47)

This application is a continuation-in-part of our co-pending application, Serial No. 218,040, filed August 20, 1962, and now abandoned.

This invention relates generally to a magnetic recording medium, more particularly a magnetic recording tape, and to a method of manufacturing the same.

Perhaps the most widely known and used magnetic recording medium at the present time is that consisting of acicular iron oxide deposited in the form of a thin coating on a suitable flexible base or substrate, usually paper or plastic. While it is highly desirable that a magnetic recording medium be capable of storing in a given space as much information as possible without loss of definition and while magnetically susceptible materials which are superior to iron oxide in this respect are known, the use of these materials is handicapped by the problems involved in forming them as a thin layer free of discontinuities and intimately bonded to a suitable substrate. Some success has been achieved in this direction in nickel and nickel-cobalt alloys applied to flexible non-conductive substrates by means of electroless deposition. As recording media, however, these leave much to be desired in the way of optimum characteristics for use for information storage in electronic computers and data processing systems generally. Not the least of their shortcomings are their relatively low coercivities.

The value of polyester films as a substrate for magnetic recording tapes also has long been appreciated, and such films have in fact been used successfully as a base for some magnetic coatings, notably iron oxide. However, the nature of the films has been a stumbling block to the application of most other magnetic coatings with a degree of adherence and absence of discontinuities necessary to a satisfactory magnetic recording medium. Specifically, the inertness of polyesters and the high-gloss hydrophobic surfaces which characterize cast films of such materials have presented a formidable problem in the dyeing, plating, and similar processing of the material. In consequence, a wide variety of surface pre-treatments have been developed to enable or improve adherence of subsequently-applied layers.

These pre-treatments take various forms and have various immediate effects. It appears that one major goal at least is to de-gloss the film, so that wettability is improved, by effectively roughening the surface to a microscopic degree. According to one general type of pre-treatment, de-glossing is accomplished by contacting the surface with a caustic solution. An example of this technique is disclosed in U.S. Letters Patent 2,968,538 to Chapman, where the caustic agents of choice are the alkali metal hydroxides. While pre-treatment of this type may be effective to achieve de-lustering of polyester films in general, and polyalkaline terephthalate films in particular, and thus adapt it for various subsequent operations, known treatments of this type have been found entirely unsuitable to preparation of the film surface for the application of magnetic coatings as contemplated by this invention.

The fundamental object of the present invention is to provide an improved magnetic recording medium and a method of manufacturing the same which overcome or mitigate the disadvantages of the prior art.

A more specific object is the provision of a metal-clad, plastic-base magnetic recording tape which combines high permeability and high remanence with high coercivity.

Another object is the provision of a magnetic recording tape of higher linear storage capacity than comparable media known heretofore.

Still another object is the provision of a novel method of making a magnetic recording medium by applying to a substrate of linear saturated polyester a thin adherent magnetic layer of uniform thickness, substantially free of discontinuities, and consisting principally of metallic cobalt.

A further object is the provision of a method of preparing the surface of a film of the linear saturated polyester type to enable the electroless deposition thereon of a thin adherent magnetic layer substantially free of discontinuities.

Generally stated, the magnetic recording medium contemplated by the present invention comprises: a flexible substrate consisting of a linear saturated polyester film; a thin continuous magnetic layer consisting principally of metallic cobalt, and preferably containing a small quantity of phosphorus, strongly adhering to a major surface of the substrate film; and, at the interface between the substrate and the magnetic layer, a large number of substantially uniformly distributed catalytic nuclei, preferably of palladium.

In accordance with another of its aspects the invention also contemplates a method of making a magnetic recording medium by coating a linear saturated polyester substrate with a magnetic layer which comprises the steps of: hydrolyzing the substrate substantially uniformly over the entire surface to be coated; chemically depositing on the hydrolyzed surface catalytic metal nuclei, preferably palladium; and contacting the surface bearing the catalytic nuclei with an electroless plating solution containing complexed cobalt ions, preferably in the presence of a hypophosphite reducing agent, to form a continuous magnetic layer, composed principally of cobalt, on that surface of the substrate. Preferably, the magnetic layer and the contiguous surface of the substrate are maintained against relative displacement during the deposition of the magnetic layer and for a sufficient period of time thereafter to enable the magnetic layer to be firmly bonded to the substrate.

Additional objects of the invention, its scope, advantages, and the manner in which it may be practiced will be readily apparent to persons conversant with the art from the following description of exemplary embodiments thereof taken in conjunction with the subjoined claims and annexed drawings in which:

FIGURE 1 is a transverse sectional view through a segment of a magnetic recording medium according to the present invention diagrammatically illustrated on an enlarged scale;

FIGURE 2 is a gross enlargement of a small portion of FIGURE 1;

FIGURE 3 is a flow diagram of a preferred embodiment of the process of the present invention for the production of a magnetic recording medium as shown in FIGURES 1 and 2; and FIGURE 4 is a flow diagram similar to FIGURE 3 and showing a modified embodiment of the process of this invention.

Referring now to the drawings and first, particularly, to FIGURES 1 and 2, there is here shown diagrammatically in transverse section a metal-clad plastic recording tape in accordance with the present invention having a polyester base or substrate and a magnetic layer of cobalt-base alloy coating adherently disposed on a major surface thereof.

As shown in FIGURE 2, there are a plurality of growth nuclei, specifically minute particles of metallic palladium (grossly exaggerated in size to permit illustration), adhered to the plastic base at the interface between the base and the magnetic layer. For best results, these growth nuclei must be present in a certain minimum density on the surface of the plastic base and the spacing between nuclei must not exceed a certain limiting value in order to facilitate the deposition of a magnetic layer which is substantially free of discontinuities and which firmly adheres to the plastic base. Both of these latter characteristics are essential to the practical utility of the finished article as an information storage medium.

The manner in which the palladium growth nuclei are provided on the surface of the plastic substrate is described in detail hereinbelow. Optimum results have been obtained where there are a minimum of 13 such nuclei, having a transverse dimension of 50 angstrom units or more, on each square micron of surface area of the plastic base or substrate, and where the average spacing between individual nuclei does not exceed 2800 angstrom units.

As previously mentioned, the substrate material employed as the base for the magnetic layer is a linear saturated polyester film, for example, a poly (alkylene) terephthalate and, specifically poly (ethylene) terephthalate.

Linear saturated polyesters of the type satisfactory for use in the present invention are well-known in the art; for details of the production of such polymeric materials reference may be had to U.S. Patents Nos. 2,465,-319; 2,850,483; and 2,857,363.

The presently preferred materials for use as the substrate is polyethylene terephthalate which may be conveniently produced by an ester interchange reaction between methyl terephthalate and ethylene glycol in the presence of a catalyst, such as metallic sodium.

Suitable polyester films are commercially available under a variety of trade names including "Mylar" (Du Pont), "T–16" (Eastman Kodak), and "Melinex" (Imperial Chemical Industries Limited). While these films are supplied in a wide assortment of dimensions for use as the substrate in magnetic recording tape, the material preferably is on the order of .5 to 10 mils in thickness and from about ⅛ inch to about 48 inches in width, and has an indeterminate length, depending upon convenience or necessity, adapting the tape for storage on a reel or similar device.

The preferred cobalt-base magnetic layer contains no less than about 97 percent cobalt and the balance phosphorus. Small quantities of nickel and/or iron may be included but have the effect of lowering the coercivity of the magnetic layer. When applied in the manner contemplated by the present invention and described hereinbelow, the cobalt-phosphorus alloy magnetic layer has a unique and highly advantageous combination of magnetic characteristics, namely, as previously mentioned, high permeability, high remanence, and high coercivity. Of equal or greater importance from the standpoint of information storage capacity and sharpness of definition, the magnetic layer exhibits a substantially square magnetic hysteresis loop.

To produce the unique product described hereinabove in conjunction with FIGURES 1 and 2, the process of this invention combines three principal phases:

(1) A particular surface pre-treatment of the substrate;

(2) The application of catalytic growth nuclei to the pre-treated surface of the substrate; and (3) Deposition on that substrate surface of a magnetic layer by the autocatalytic reduction from an electroless plating solution containing complexed cobalt ions, and preferably also containing hypophosphite ions which serve both as a reducing agent and a source of phosphorus for the magnetic layer.

The details of a preferred embodiment of the method of this invention will now be described with continuing reference to the flow diagram constituting FIGURE 3 of the drawings.

For literary ease and convenience the flow diagram and the following description relate to a specific process and product. It will be understood, however, that this example is presented by way of illustration and not limitation, as changes and substitutions within the spirit and scope of the invention will undoubtedly occur to persons skilled in the art.

HYDROLYSIS

In the illustrated embodiment one mil thick "Mylar" tape one inch wide was employed as the substrate. A 100-foot reel of this tape was subjected to a particular pretreatment step adapted to achieve substantially uniform hydrolysis of the tape surface. This was accomplished by immersion of the tape in a hot aqueous caustic solution composed of 200 grams per liter of sodium hydroxide and 150 milliliters per liter of propylene glycol. With this particular solution, at a temperature of 80 to 85° C., an immersion period of three minutes provided adequate hydrolysis. It will be appreciated, however, that the constituency of the solution, its concentration and temperature, as well as the particular identity of the substrate film, are variable, inter-related parameters all influencing the required time of immersion.

In the hydrolyzing solution, any alkali or alkaline earth metal hydroxide might have been used in place of sodium hydroxide, and in lieu of propylene glycol any monohydric or polyhydric alcohol, such as an alkylene glycol soluble and stable in the solution at its operating temperature might be employed. Examples of suitable alcohols are ethylene glycol, diethylene glycol, and ethyl alcohol. In this connection, however, it should be pointed out that, in addition to limitations imposed by solubility and stability, the more volatile alcohols, such as ethyl alcohol, create a problem due to their tendency to evaporate in use.

SENSITIZATION

Following hydrolysis, the tape was rinsed in water to remove any residual caustic solution and then sensitized by immersion in an acid solution of stannous chloride ($SnCl_2$). In the exemplary embodiment the solution consisted of 70 grams per liter of stannous chloride, 50 milliliters per liter hydrochloric acid (HCl) and 0.5 gram per liter of sodium lauryl sulfate; immersion of the tape in the solution was for two minutes at room temperature although, here again, the time is subject to variation.

The presence of stannous ions ($Sn^{++}$) is indispensable to operativeness of the solution to sensitize the tape surface for subsequent adsorption of catalytic nuclei as hereinafter described; however, it has been found that although stannic ions ($Sn^{++++}$) are ineffective in themselves to sensitize the tape surface, their presence in the solution increases the adsorption of tin and, as an ultimate result, increases the adsorption of catalytic nuclei deposited in a subsequent step. As little as 1 gram per liter of stannic chloride is effective to produce some increase in the tin adsorption. Moreover, in place of the stannous and stannic chlorides, other halide salts of tin may be employed.

ACTIVATION

Following sensitization, the tape was rinsed in water and immersed in an activating bath made up of an aqueous solution of 10 grams per liter of silver nitrate. Immersion of the tape in the activating bath was continued for a period of about 1 minute, although this might be varied from 15 seconds to 5 minutes. During this time the reducing action of stannous ions adsorbed on the surface of the tape causes the deposition of isolated particles of silver-silver oxide material which adhere strongly to the surface.

SEEDING

Once again the tape was rinsed in water and then seeded with catalytic growth nuclei by immersion in an acidic solution of palladium chloride. Here the silver particles present on the surface of the tape as a result of the activation step are replaced by palladium particles, producing the metallic palladium nuclei hereinbefore mentioned and described.

The seeding solution in the illustrated embodiment consisted of 0.1 gram per liter of palladium chloride and 1.0 milliliter per liter of 35 percent concentrated hydrochloric acid. Immersion of the tape in the palladium chloride solution was for one minute, but may be varied from 15 seconds to 5 minutes.

While palladium chloride is the preferred catalyst, any palladium halide salt may be used.

Following seeding, the tape was rinsed in water to remove the excess solution; the rinse did not disturb the growth nuclei which were strongly adsorbed on the tape surface.

In the specific example under discussion, complete coverage and satisfactory subsequent deposition of the cobalt-phosphorous magnetic layer were obtained when there were at least 13 palladium nuclei, larger than 50 Angstrom units, per square micron of substrate surface and with a maximum distance of 2700 Angstrom units between adjacent palladium nuclei after the seeding step in the process. The number and spacing of the nuclei were verified by electron mircrographs (36,500×) of samples of the substrate surface following the seeding operation.

During the preliminary or pre-plating steps thus far described it is essential that there be no physical contact with the particular surface of the tape on which the magnetic layer is to be applied. To this end the tape was passed through the various solutions while supported on suitably disposed and arranged guide rolls, the tape being given a 180° twist between rollers involving a change in direction of travel.

As indicated previously, the various times of immersion are not in any way critical; however, each should be long enough to insure complete wetting of the tape surface and sufficient time for the particular reaction involved to occur. Where the pre-treatment is carried on as a continuous process involving passage of a continuous tape over guide rolls through the various solutions, the time of immersion, of course, can be regulated by controlling the transport rate of the tape in conjunction with adjustment of the length of run of tape immersed at one time in a particular solution.

PLATING

Having thus prepared the tape, the cobalt-phosphorus alloy magnetic layer was then deposited on the surface thereof by electroless plating in the following manner.

Generally stated, plating of the cobalt-phosphorus alloy is accomplished by passing the prepared tape through an electroless plating solution containing complexed cobalt ions and a hypophosphite reducing agent. In the described embodiment plating solutions were used which had the following range of compositions:

| | Gms./l. |
|---|---|
| Cobalt sulfate·$7H_2O$ | 28–32 |
| Ammonium chloride | 50–100 |
| Sodium potassium tartrate | 50–75 |
| Sodium hypophosphite | 20–25 |

The pH of such plating solutions was adjusted to between 8.7 and 8.9 with ammonium hydroxide. The alloy plated from solutions having concentrations within the ranges set forth above contained from 1 to 1.5 weight percent phosphorus and the balance cobalt.

A preferred plating bath composition is as follows:

| | Gms./l. |
|---|---|
| Cobalt sulfate·$7H_2O$ | 30 |
| Ammonium chloride | 50 |
| Sodium potassium tartrate | 50 |
| Sodium hypophosphite·$H_2O$ | 20 |
| Ammonium hydroxide to give pH 10. | |

Operating at a temperature of 68–70° C. this preferred plating solution yielded a uniform continuous plate in the order of 20 micro-inches in thickness in a plating time of about 12 minutes.

While the chemical aspects of the plating step are important to the formation of a satisfactory magnetic coating, of equal and perhaps greater importance are the physical conditions under which plating is carried out. It is essential that the tape be brought into contact with the plating solution without subjecting it to any physical stresses such as would stretch, twist, or otherwise physically distort the tape except for simple large radius bending. The reason for this will be apparent in the light of an explanation of what is believed to be the manner in which the plating forms and is bonded to the substrate.

While the tape is in contact with the plating solution, the palladium nuclei catalyze the reduction of metallic cobalt, alloyed with phosphorus from the sodium hypophosphite reducing agent, and serve as nucleation centers for the formation of an isotropic layer of the alloy which conforms precisely to the microscopic topographical features of the tape surface. At this stage the adherence between the magnetic layer and the substrate is rather tenuous; it is believed to be established by the Vander Waals forces which are effective because of the very close approach of the layer and substrate. Consequently, any distortion of the substrate or other effect which tends to cause relative displacement between the plated layer and substrate before the plated layer is permanently bonded in the manner hereinafter described precludes the formation of a proper bond between the substrate and the plated layer. Therefore, the plated layer and the tape should be maintained against relative displacement until permanent bonding is achieved.

In the continuous plating of a tape of indeterminate length alluded to hereinabove, the physical conditions prerequisite to satisfactory electroless plating were fulfilled by using a four-inch-diameter Pyrex U-tube, a stock industrial item, as the plating vessel. To provide a submerged run of tape three feet in length for the particular described embodiment, the legs of the U-tube were increased in length by joining straight glass tubes thereto. To maintain the tape against any distortion except simple large radius bending while in the plating solution, a flat, two inch wide strip of "Teflon" (polytetrafluorethylene) curved to the inner radius of the U-tube was inserted into the bend of the U-tube. The tape travelled through the electroless plating solution in the U-tube with the not-to-be-plated surface riding firmly against the Teflon U-bend, passing over synchronously driven feed and take-up reels to preclude stretching of the tape.

A standard heating mantle enveloped the U-tube to enable temperature control of the solution and conventional means were utilized for continuous filtration of the electroless plating bath.

Bonding of the cobalt-phosphorus layer to the substrate may be accomplished by natural aging, which may vary from a few minutes to a day at room temperature or, preferably, by heat treatment of the tape to accelerate the aging process. Heat treatment involves heating the tape to a temperature of about 70° C. for from 1 to 60 minutes immediately after plating and prior to rinsing.

After a final water rinse the tape is then dried and stored for use.

The sensitization and activation steps of the method may be eliminated from the method described by modification of the seeding step. A flow diagram for this modified embodiment of the invention is illustrated in FIGURE 4, from which it will be seen that the hydrolysis and the plating steps are the same as illustrated in FIGURE 3. In this variant, seeding is accomplished by immersing the hydrolyzed tape, after rinsing, in a catalytic metal sol. The tape is then rinsed in water, plated, and finished in the same manner as in the FIGURE 3 method.

For additional information as to the use of catalytic metal sols for seeding substrates prior to electroless plating reference may be had to U.S. Patent 3,011,920.

A specific example of seeding of "Mylar" tape with palladium growth nuclei deposited from a sol is as follows.

A palladium sol was prepared by reduction of palladium chloride solution (pH adjusted to 5) with Formalin at 50° C. The hydrolyzed tape was immersed in the freshly-prepared sol for 1 to 2 minutes, rinsed with water and then plated in an electroless cobalt bath, as described above.

In this modified embodiment of the present process, the number of catalytic nuclei per unit area and spacing therebetween are maintained as described in connection with the FIGURE 3 embodiment.

Cobalt-phosphorus alloy layers deposited in accordance with the present invention are extremely thin, ranging from 5 to 100 micro-inches in thickness depending on various process parameters including the exact bath composition, temperature, time of immersion, and the like. The plating is remarkably uniform in thickness, fine-grained, and substantially free of discontinuities greater than 1.0 mil in the longitudinal direction of the tape and 0.25 mil in the transverse direction.

The following table shows the parameters of several tapes according to the present invention which were produced in accordance with the embodiment of the present process shown in FIGURE 3 and described in detail hereinbefore:

| Thickness of Magnetic Layer (in micro-inches) | Coercivity $H_c$ (in oersteds) | Retentivity or Remanent flux Density $B_r$ (in gauss) |
|---|---|---|
| 18 | 410 | 6, 900 |
| 22 | 310 | 4, 080 |
| 24 | 350 | 5, 960 |
| 18 | 290 | 5, 820 |
| 22 | 360 | 6, 000 |
| 19 | 420 | 5, 300 |
| 19 | 400 | 6, 030 |
| 18. 5 | 420 | 5, 860 |
| 18 | 450 | 5, 600 |
| 19 | 360 | 4, 700 |
| 19 | 400 | 6, 540 |
| 19 | 460 | 5, 930 |
| 9 | 420 | 11, 500 |

From the foregoing table it will be evident that each of these tapes had a coercivity of at least substantially 300 oersteds (290 being the lowest) and a rentenitivity, or remanent flux density, higher than 4,000 gauss. Due to the higher coercivity and retentivity, the tapes of the present invention are capable of higher output signals (with a higher signal-to-noise ratio) on playback and higher "packing" densities of recorded binary digits, as well as being adapted for slower speed playback operation. It has been determined that the tape of the present invention is capable of recording with much smaller pulse width—¼ to ⅓ of the pulse width obtainable with conventional magnetic record media. As a result of the narrow pulse capability, the present tape can record up to three times the amount of information per unit of tape length than conventional tapes. Specifically, conventional magnetic tapes are capable of storing 250 to 500 binary digits or "bits" per inch as compared to 1,000 to 1,500 or more bits per inch for magnetic tapes in accordance with the present invention.

These improved characteristics make the tape of the present invention especially advantageous for instrumentation applications, such as in computers.

While there have been described what at present are believed to be the preferred embodiments of this invention, it will be obvious to those skilled in the art that various changes and modifications may be made therein without departing from the invention, and it is aimed, therefore, to cover in the appended claims all such changes and modifications as fall within the true spirit and scope of the invention.

What is claimed and desired to be secured by United States Letters Patent is:

1. A method of making a magnetic recording medium which comprises the steps of:

hydrolyzing a surface of a polyethylene terephthalate substrate with an aqueous solution consisting essentially of (a) a metal hydroxide selected from the class consisting of alkali metal and alkaline earth metal hydroxides; and (b) an alcohol selected from the class consisting of monohydric and polyhydric alcohols soluble and stable in the solution at the temperature being used;

depositing on said hydrolyzed surface particles of palladium metal, there being an average of at least 13 of said particles having a size larger than 50 Angstrom units deposited per square micron of said surface, and the distance between adjacent said particles is no greater than about 2800 Angstrom units; and thereafter contacting said surface with an electroless plating solution containing cobalt ions to form a continous magnetic layer, composed principally of cobalt, intimately bonded directly to the substrate at said surface with only said palladium particles therebetween.

2. A method of making a magnetic recording medium which comprises the steps of:

hydrolyzing a surface of a linear saturated polyester substrate with an aqueous solution consisting essentially of (a) a metal hydroxide selected from the class consisting of alkali metal and alkaline earth metal hydroxides; and (b) an alcohol selected from the class consisting of monohydric and polyhydric alcohols soluble and stable in the solution at the temperature being used;

chemically depositing on said hydrolyzed surface palladium metal, there being an average of at least 13 of said particles having a size larger than 50 Angstrom units deposited per square micron, of said surface, and the distance between adjacent said particles is no greater than about 2800 Angstrom units;

thereafter contacting said surface with an electroless plating solution containing complexed cobalt ions and a hypophosphite reducing agent to form a continuous magnetic layer of metallic cobalt-phosphorus alloy on said surface; and maintaining said magnetic layer and said surface substantially against relative displacement during the formation of the magnetic layer and for a finite period of time thereafter until the layer is firmly bonded directly to said surface with only said palladium particles therebetween.

3. A method according to claim 2 wherein bonding of said magnetic layer to said surface is accelerated by the application of heat while the magnetic layer and surface are maintained substantially against relative displacement.

4. A method according to claim 3 wherein said palladium nuclei are deposited by immersing the substrate in sequence in an aqueous acid solution of a stannous halide, a silver salt in aqueous solution, and an aqueous acid solution of a palladium halide.

5. A method of making a magnetic recording tape which comprises the steps of:

contacting at least one major surface of a polyethylene terephthlalate film with a hot aqueous caustic solution containing alkylene glycol and a metal hydroxide selected from the class consisting of alkali metal and alkaline earth metal hydroxides until said surface is hydrolyzed to an extent approximately equivalent to that produced by contact with an aqueous caustic solution containing 200 gm./l. of sodium hydroxide and 150 ml./l. of propylene glycol at a temperature of 80–85° C. for approximately 3 minutes;

chemically depositing directly on said hydrolyzed surface catalytic nuclei of metallic palladium, there being an average of at least 13 of said particles having a size larger than 50 Angstrom units deposited per square micron of said surface, and the distance between adjacent said particles is no greater than about 2800 Angstrom units;

thereafter contacting said surface with an electroless plating solution containing complexed cobalt ions and a hypophosphite reducing agent to form a continuous magnetic layer of metallic cobalt-phosphorus alloy contiguous with and precisely conforming to the microscopic topographical features of said surface while maintaining said layer and said surface against relative displacement, said hydrolyzed film surface and said cobalt-phosphorus layer having only said palladium particles therebetween; and while the magnetic layer and said surface are maintained against relative displacement, heating the film and the magnetic layer to a temperature of at least about 70° C. for from 1 to 60 minutes.

6. A method according to claim 5 wherein said caustic solution consists essentially of propylene glycol and sodium hydroxide.

7. A method according to claim 5 wherein said caustic solution consists essentially of:

| | | |
|---|---|---|
| Sodium hydroxide | gms./l. | 200 |
| Propylene glycol | ml./l. | 150 |

8. A method according to claim 7 wherein said catalytic nuclei are deposited by:

contacting said surface of the substrate with a sensitizing solution consisting essentially of:

| | | |
|---|---|---|
| Stannous chloride | gms./l. | 70 |
| 36% conc. HCl | mls./l. | 50 |
| Sodium lauryl sulfate | gms./l. | 0.5 |

subsequently contacting said surface with an activating solution consisting essentially of:

| | | |
|---|---|---|
| Silver nitrate | gms./l. | 10 |

and subsequently contacting said surface with a seeding solution consisting essentially of:

| | | |
|---|---|---|
| Palladium chloride | gm./l. | 0.1 |
| 36% conc. HCl | ml./l. | 1.0 |

9. A method according to claim 8 wherein said electroless plating solution consists essentially of:

| | Gms./l. |
|---|---|
| Cobalt sulfate ($CoSO_4 \cdot 7H_2O$) | 30 |
| Amonium chloride | 50 |
| Potassium sodium tartrate | 50 |
| Sodium hypophosphite ($NaPO_2 \cdot H_2O$) | 20 |
| Ammonium hydroxide to give pH 10. | |

10. A method of treating the surface of a thin flexible body of polyethylene terephthalate to form a hydrophilic surface thereon to facilitate subsequent deposition of adherent palladium particles and an adherent superimposed cobalt layer, comprising:

contacting the surface of the body with a hot aqueous solution of a hydroxide selected from the group consisting of the alkali and alkaline earth hydroxides and containing an alcohol selected from the group consisting of monohydric and polyhydric alcohols soluble and stable in said solution at its temperature of use until a substantial amount of hydrolysis is effected on the surface of said polyethylene terephthalate, thereafter depositing palladium particles on said hydrolyzed surface and subsequently superimposing a thin layer of cobalt on said palladium particles and said hydrolyzed surface, said layer of cobalt being deposited from an electroless plating solution containing cobalt ions.

11. A method according to claim 10 wherein said hydroxide is NaOH and said alcohol is propylene glycol.

12. A method of claim 10 in which said treating comprises:

immersing said body for about three minutes in an aqueous solution consisting essentially of 200 grams/liter of an alkali metal hydroxide and 150 milliliter/liter of propylene glycol while said solution is at a temperature of about 80 to 85° C.

13. A magnetic recording medium comprising:

a flexible substrate consisting of a polyethylene terephthalate film;

a thin continuous magnetic layer, consisting essentially of cobalt containing up to 3 weight percent of phosphorus, firmly bonded directly to a major surface of the substrate; and at the interface between the substrate and the magnetic layer, having only a large number of substantially uniformly distributed particles of metallic palladium.

14. A magnetic recording medium comprising:

a flexible substrate consisting of a polyethylene terephthalate film;

a thin continuous magnetic layer, consisting essentially of metallic cobalt containing a small quantity of phosphorus, adherently bonded directly to a major surface of the substrate; and having at the interface between the substrate and the magnetic layer only, a large number of substantially uniformly distributed particles of metallic palladium, there being at least 13 of said particles larger than 50 Angstrom units per square micron of interface area, the distance between adjacent particles being less than about 2800 Angstrom units.

15. A magnetic recording medium comprising:

a flexible substrate of polyethylene terephthalate;

a thin continuous magnetic layer, consisting essentially of cobalt containing up to 3 weight percent phosphorus, adherently bonded directly to a major surface of the substrate; and having at the interface between the substrate and the magnetic layer, only a large number of substantially uniformly distributed particles of metallic palladium, there being at least 13 of said particles larger than 50 Angstrom units per square micron of interface area, the distance between adjacent particles being less than about 2800 Angstrom units.

16. A flexible magnetic recording tape comprising:

a thin film of polyethylene terephthalate having a major face;

particles of palladium distributed substantially uniformly over said major face of the film and bonded thereto; and a thin continuous magnetic layer overlying said palladium particles and adherently bonded directly to the film across said major face thereof with only said palladium particle therebetween, said magnetic layer being composed essentially of cobalt-phosphorus alloy containing at least 97 weight percent cobalt, said magnetic layer having a coercivity of at least substantially 300 oersteds, a retentivity of at least substantially 4000 gauss, and a finite thickness not greater than substantially 100 micro-inches.

17. A flexible magnetic recording tape comprising:

a thin film of polyethylene terephthalate having a major face;

particles of palladium adhering to said major face of the film and distributed substantially uniformly across said major face; and a thin continuous magnetic layer overlying said palladium particles and adherently bonded directly to the film across said major face thereof with only said palladium particles therebetween, said magnetic layer being composed essentially of cobalt-phosphorus alloy having at least 97 weight percent cobalt, said magnetic layer having a coercivity of at least substantially 400 oersteds, a retentivity of at least substantially 4000 gauss, and a finite thickness not greater than substantially 100 micro-inches.

References Cited by the Examiner

UNITED STATES PATENTS

| | | | |
|---|---|---|---|
| 2,671,034 | 3/1954 | Steinfeld | 117—71 |
| 2,702,253 | 2/1955 | Bergstrom | 117—130 |
| 2,764,502 | 9/1956 | Emerson | 117—47 |
| 2,828,528 | 4/1958 | Gajjar. | |
| 2,900,282 | 8/1959 | Rubens | 117—227 |
| 2,955,954 | 10/1960 | Collins | 117—47 |
| 2,998,296 | 8/1961 | Hennemann. | |
| 3,006,819 | 10/1961 | Wilson et al. | 117—130 |
| 3,011,920 | 12/1961 | Shipley | 117—47 |
| 3,098,803 | 7/1963 | Godycki et al. | |
| 3,116,159 | 12/1963 | Fisher et al. | 117—47 |
| 3,138,479 | 6/1964 | Foley | 117—47 |
| 3,142,581 | 7/1964 | Leland | 117—47 |
| 3,142,582 | 7/1964 | Koretzsky et al. | 117—47 |
| 3,150,939 | 9/1964 | Wenner | 29—195 |

FOREIGN PATENTS

| | | |
|---|---|---|
| 605,638 | 9/1960 | Canada. |
| 758,745 | 10/1956 | Great Britain. |
| 786,153 | 11/1957 | Great Britain. |
| 818,121 | 8/1959 | Great Britain. |

OTHER REFERENCES

Saubestre: "Electroless Plating Today," Metal Finishing, June 1962, pp. 67–73; July 1962, pp. 49–53; August 1962, pp. 45–52; September 1962, pp. 59–63.

Brenner et al.: "Electrodeposition of Alloys of Phosphorus and Nickel or Cobalt," Plating, January 1950, vol. 37, TS670A3.

Brenner: "Electroless Plating Comes of Age," Metal Finishing, November 1954, vol. 52, No. 11; December 1954, vol. 52, No. 12, TS200M587.

"Symposium on Electroless Nickel Plating": ASTM Special Technical Publication No. 265, American Society for Testing Materials, Philadelphia, 1959, TS690A5.

WILLIAM D. MARTIN, *Primary Examiner.*

MURRAY KATZ, *Examiner.*